April 16, 1946.　　A. H. SCHUTTE　　2,398,725
MAGNETIC SEPARATION
Filed Sept. 10, 1943　　2 Sheets-Sheet 1
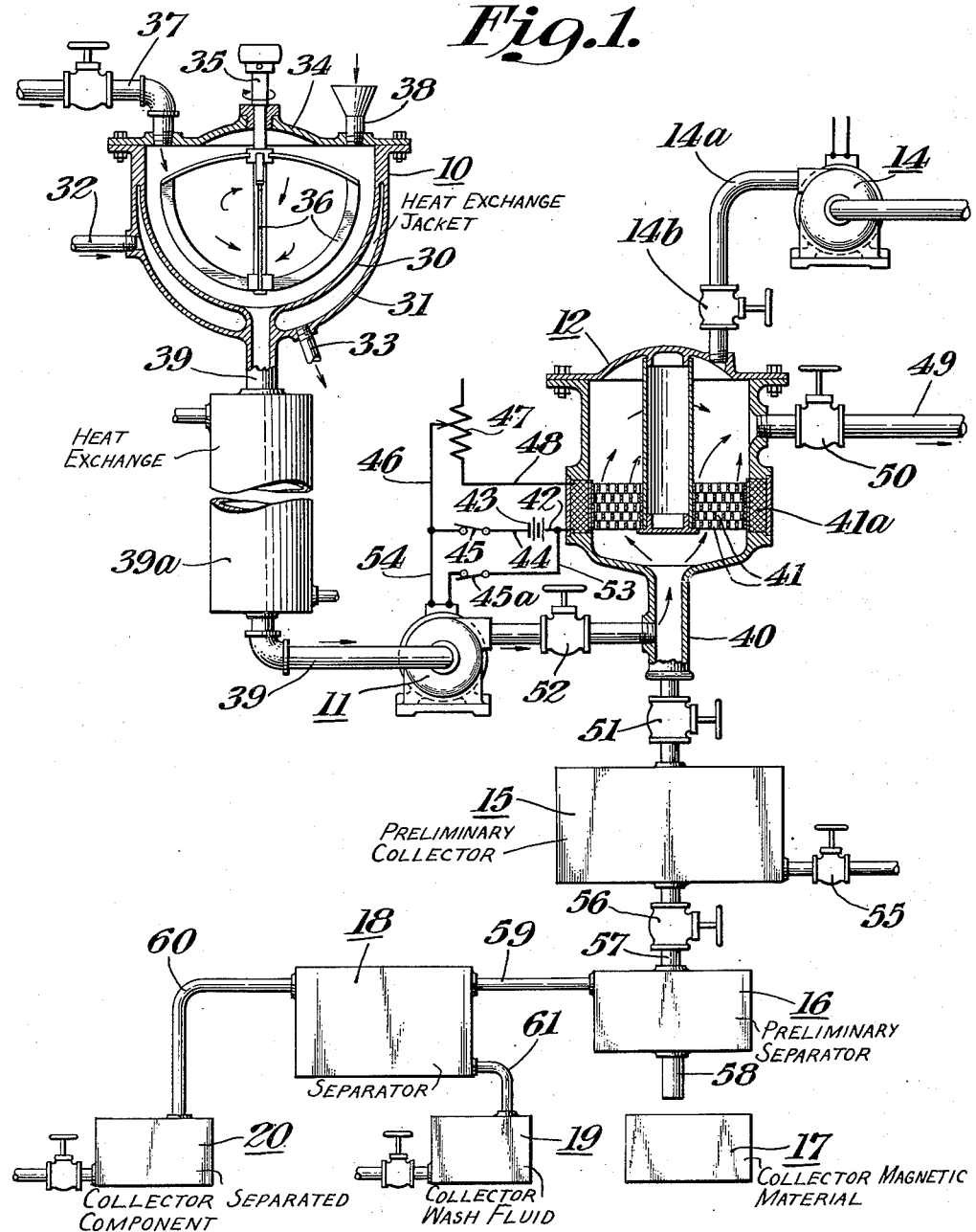
Fig.1.
INVENTOR
August Henry Schutte
BY
ATTORNEY Patented Apr. 16, 1946

2,398,725

UNITED STATES PATENT OFFICE 2,398,725

MAGNETIC SEPARATION

August Henry Schutte, Hastings on Hudson, N. Y.

Application September 10, 1943, Serial No. 501,845

6 Claims. (Cl. 196—18)

This invention relates to selective separation and, in particular, to the separation or selective removal, from a mixture comprising a plurality of components, of a predetermined component or predetermined components thereof.

It is an object of this invention to effect such separation by the introduction to the mixture, preferably in comminuted or finely divided form, of magnetic material having sufficient affinity to combine, mechanically at least, with the component desired to be removed, followed by magnetic removal and collection of the magnetic material and desired component.

It is a further object of this invention to provide method and apparatus for efficient and convenient achievement of the above object, and, in addition, to the further separation of collected component and magnetic material.

These and other objects and advantages of the invention will appear from the following description taken with the drawings and appended claims.

In the drawings:

Fig. 1 is a diagrammatic view illustrative of the method and apparatus comprising this invention, showing the separating cycle, with flow direction indicated by arrows.

Figure 2:
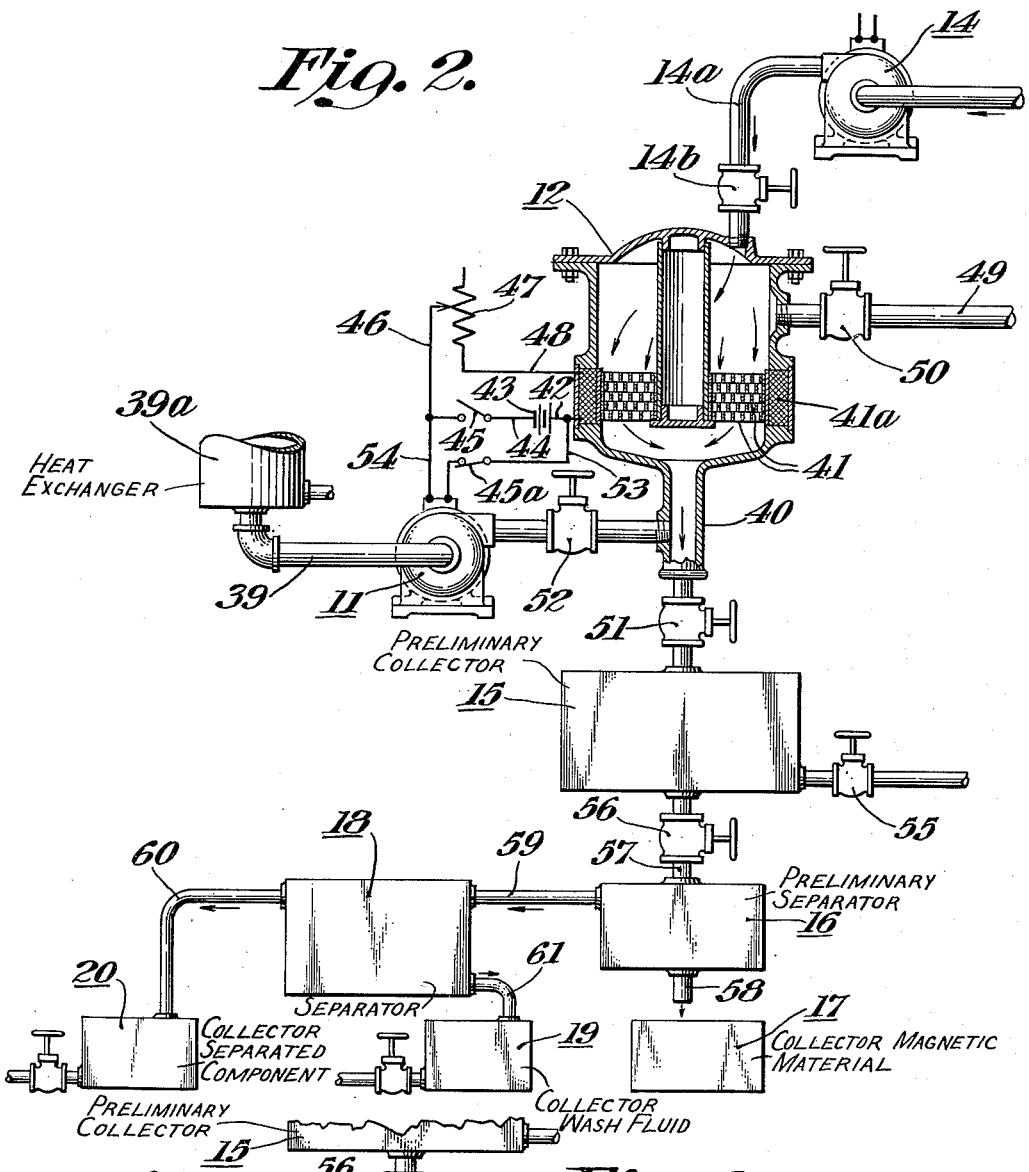
Fig. 2 is a fragmentary view, similar to Fig. 1, but illustrating the collection cycle wherein the magnetically collected magnetic material and combined component are removed from the magnetic separator or filter device, the direction of flow being indicated by arrows.

Referring to the drawings in detail, and with reference particularly to Fig. 1, the mixer, generally designated 10, receives and combines with a mixture or solution comprising plural components, magnetic material in finely divided or comminuted form. The product is forced by a pump, generally designated 11, through a magnetic separator or filter generally designated 12.

The separator or filter 12 is provided with a magnetic field of adjustable intensity in the path of flow of the mixture. This magnetic field collects and retains the previously introduced magnetic material and adhering, mechanically or otherwise combined, component in the mixture passing through the separator or filter 12. The remainder of the mixture initially introduced to the mixer 10 flows out of the separator or filter 12 as indicated by the arrows in Fig. 1. This cycle may be termed the separating cycle of the method and is illustrated in Fig. 1.

As will be readily understood, the above cycle may not be continued indefinitely without cleaning or washing the magnetic separator or filter 12; this is done periodically, as illustrated in Fig. 2, by closing off the separator or filter 12 from the mixer 10 i. e. cutting off the supply of mixture to the separator or filter 12 and de-energizing the pump 11 and the magnetic field of the separator or filter 12 by opening the common switch controlling their circuits. Wash fluid (such as water) is then forced by pump 14 through the separator or filter 12 in the direction opposite the direction of flow of the mixture therethrough in the above described separating cycle as shown by the arrows in Fig. 2.

From the separator or filter 12 the wash fluid and entrained magnetic material (with adhering or combined component) flow to the preliminary collector, generally designated 15. When it is undesirable further to utilize the magnetic material, separated component or wash fluid, the contents of the preliminary collector 15 may be drawn off and sent to waste.

Figure 3:
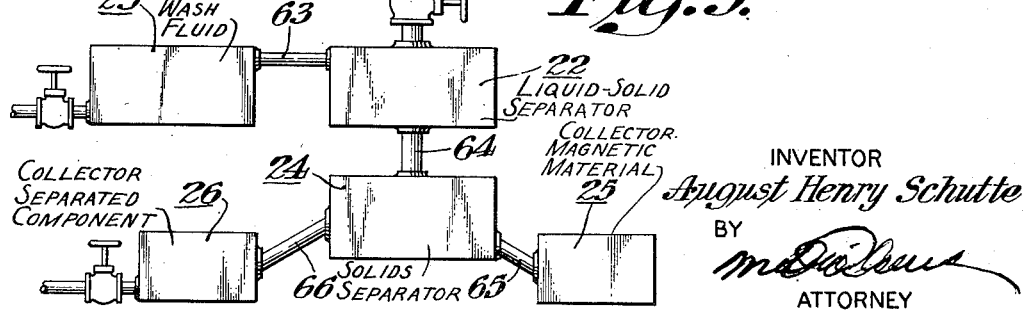
Fig. 3 is a fragmentary diagrammatic view of a modification of the cycle and apparatus illustrated in Fig. 2.

Where, however, it is desired to utilize the separated component (for instance where it is the product of primary importance) and/or reuse the magnetic material and wash fluid, these contents of the preliminary collector 15 are withdrawn and thereafter separated either as illustrated in Fig. 2 or as illustrated in Fig. 3.

As shown in Fig. 2, the contents of the preliminary collector 15 pass into the preliminary separator 16 which re-separates the magnetic material from the wash fluid and separated component. The magnetic material passes thence to the collector 17 and the mixture of wash fluid and separated component pass into the separator 18 where they are separated. The wash fluid passes thence into the collector 19 and the separated component into the collector 20.

As shown in Fig. 3, a liquid-solids separator 22 may be substituted to advantage, in certain cases, for the preliminary separator 16 described above; this separator 22 will separate the wash fluid from the solids (separated component and magnetic material). The wash fluid passes thence to the collector 23 while the solids pass into the solids separator 24. In the solids separator 24, the magnetic material and separated component are separated, the magnetic material passing into the collector 25 and the separated component passing into the collector 26.

If desired, connections (not shown) may be provided for returning the magnetic material from the collectors 17 (Fig. 2) or 25 (Fig. 3) to the mixer 10 for reuse. Similar connections (not shown) may be provided between the collectors 19 (Fig. 2) or 23 (Fig. 3) and the wash fluid inlet of the magnetic separator or filter 12.

The above described mixer 10 comprises a receptacle 30 provided with a heat exchange jacket 31 of conventional type having an inlet 32 for steam, coolant, or other suitable heat exchange material and an outlet 33 for such heat exchange material, or the condensate thereof. By means of this heat exchange jacket 31 the temperature of the material in the receptacle 30 may be closely controlled, as desired. The cover 34 of the mixer 10 is provided with suitable means for supporting the driven shaft 35 of the agitator which shaft is provided with blades 36 which stir or agitate the material in the receptacle 30. A supply inlet 37 communicates through the cover 34 with the interior of the receptacle 30 to provide means for supplying a mixture comprising a plurality of components desired to be separated. A hopper 38, communicating with the interior of the receptacle 30, is also provided for supplying magnetic material in comminuted, or finely divided form to the interior of the receptacle 30 wherein it is mixed, at temperature controlled by the heat exchange jacket 31, with the mixture supplied through the inlet 37.

After the above described mixing has been accomplished, the outlet 39, extending from the lower end of the receptacle 30 through the heat exchange jacket 31, conveys the combined mixture and comminuted magnetic material to the pump 11 which forces it upwardly through the inlet pipe 40 of the magnetic separator or filter 12, under control of valve 52, into the lower end of the internal chamber thereof, whence it passes through the magnetic filter element 41.

Optionally, the outlet 39 may be provided with a heat exchanger, indicated 39a in Fig. 1, to secure the ultimate achievable degree of combination with the magnetic material of the component desired to be magnetically separated from the other components of the mixture, by changing the temperature thereof. For instance, where the mixture introduced through inlet 37 is an oil-wax mixture, steam, hot water or other heat exchange material is supplied to jacket 31 to maintain the contents of the receptacle 30 at predetermined high temperature.

At this temperature the magnetic material is stirred with the mixture by the agitator for uniform distribution, then by admission of suitable heat exchange medium into the heat exchanger 39a, the temperature is rapidly lowered to increase separation of the wax from the oil with ultimate adhesion or combination of the wax and the magnetic material as well as decrease of the internal forces in the mixture necessary to be overcome by the magnetic separator in separating the magnetic material and adhering wax from the oil component of the mixture.

The magnetic filter element 41 comprises a plurality of perforate or foraminous screens or grids having interstices or apertures of suitable size for passage of the mixture to be separated, which are magnetically energized by a surrounding coil 41a having a circuit comprising the wire 42 leading to one terminal of a source of electrical energy 43 which source 43 has its other terminal connected by wire 44 with one terminal of a suitable switch 45. The other terminal of the switch 45 is connected by the wire 46 with one terminal of a conventional rheostat, or adjustable resistance device 47, which has its other terminal connected with the return wire 48 leading to the coil of the magnetic filter element 41. When the switch 45 is closed, as shown in Fig. 1, the element 41 is energized, and passage of the mixture and suspended magnetic material through the magnetically energized grids or screens of the element 41 in the direction shown by the arrows in Fig. 1 will cause the finely divided or comminuted particles of magnetic material, with combined or adhering component of the mixture initially introduced to the mixture 10 through the inlet 37, to be deposited on and retained by the magnetized filter element 41 while the mixture, minus the separated component, passes through the outlet 49 of the magnetic separator or filter 12 under the control of the valve 50. The inlet 40 of the separator or filter 12 is provided with a valve 51 which is closed during this separating cycle. The above mentioned valve 52 provided between the pump 11 and the inlet 40, is similar to the valve 51 and is open during the separating cycle.

The heat exchanger 39a illustrated is of single stage type but it is, of course, contemplated that multi-stage heat exchangers or a plurality of single stage heat exchangers may be utilized, in the same relation, to deliver the mixture and suspended magnetic material to the magnetic separator or filter at optimum temperature.

As shown in Fig. 1, the mixture thus supplied through the inlet 40 passes upwardly through the magnetic field established in the screens or grids of the filter element 41 which removes from the mixture the magnetic material and adhering, or combined, component of the mixture which it is desired to remove therefrom. This magnetic material and component are magnetically retained by the screens or grids so long as the filter element 41 remains magnetized, the other component, or components, of the mixture passing out through the outlet 49 under control of the valve 50.

As shown in Fig. 2, when it is desired to clean the separator or filter 12 by regenerating or cleaning the element 41, valve 52 is closed, along with valve 50, and the switch 45 is opened to deenergize the coil 41a and pump 11. The consequent destruction of the magnetic field releases the greater part of the magnetic material and adhering component collected by the element. However, in order fully to clean the element 41, fluid wash material is introduced to the upper side of the element 41 through wash inlet 14a under control of the valve 14b and under pressure created by the pump 14.

The valve 51 is simultaneously opened whereby the wash fluid flows in a direction opposite the direction of flow of the mixture to be separated as indicated by arrows in Fig. 2. This flow of wash fluid effectively cleans the filter screens or grids of the element 41 by removing from the screens or grids all collected material not removed therefrom by gravity upon destruction of the magnetic field by opening of the switch 45.

The wash fluid and entrained magnetic material (with adhering or combined collected component) passes into the collector 15. If it is not desired to collect or utilize the removed, separated component nor to reuse the magnetic material and/or wash fluid, the contents of the collector 15 may be sent to waste by opening the valve 55 provided for this purpose in the waste outlet. Another valve 56 controls the flow of the contents of collector 15 through the outlet 57 connecting the collector 15 with the separator 16 (Figs. 1 and 2) or the separator 22 (Fig. 3). This valve 56 is, of course, normally closed to isolate the collector 15 from the separator 16 (Figs. 1 and 2) or the separator 22 (Fig. 3).

When the nature of the separated component and its adhesion to the magnetic material is such as to permit ready removal of the magnetic material from the component and wash fluid as, for instance, where the wash fluid will take the component into solution or suspension exclusively of the magnetic material, this is accomplished by a separator 16 of suitable type (Figs. 1 and 2) which delivers the magnetic material through outlet 58 to the magnetic material collector 17 while delivering the combined wash fluid and separated component through outlet 59 to the separator 18.

The separator 18 is of suitable type to separate the wash fluid from the separated component, for instance by gravity, delivering the wash fluid free separated component through outlet 60 to collector 20 and the wash fluid through outlet 61 to collector 19. As stated above, suitable connections may be provided for returning the magnetic material from collector 17 to inlet 38 and the wash fluid from the collector 19 to the inlet 53.

In certain cases, as shown in Fig. 3, a solid-liquid separator 22 may be substituted for the above described separator 16, whereby the wash fluid is separated, by gravity for instance, from the magnetic material and combined separated component. The solid-liquid separator 22 then delivers the wash fluid through outlet 63 to the wash fluid collector 23 and the magnetic material and combined component to the solids separator 24 through outlet 64.

The solids separator 24 is of suitable type effectively to separate the component from the magnetic material. For instance, in separating and removing wax from an oil-wax mixture, the magnetic material may be powdered metal, such as iron, in finely comminuted or finely divided form or magnetic iron oxide; the wash fluid may be water, and the separated component will, of course, be wax. In such case the separator 22 will separate the water from the iron and adhering wax by gravity. This iron-wax mixture will pass through outlet 64 to the separator 24. By suitable application of heat, the separator 24 will melt out the wax from the mixture. The separated component (wax) will then pass through outlet 66 to component collector 26 and the magnetic material (finely divided metal, such as iron) will pass through outlet 65 to the collector 25.

An alternative method of operation is as follows: The feed mixture may be supplied and subjected to the separating cycle as shown in Fig. 1. With the valve 56 closed, the valves 14b and 51 may be open, and the valves 50 and 52 closed. Then, with the switch 45 still closed but the switch 45a open, wash fluid may be supplied as shown by the arrows in Fig. 2 to wash out the feed material from the lower chamber of the magnetic filter or separating device 12, leaving the magnetic material and combined component which are retained by the energized filter element 41. The contents of the collector 15 may then be withdrawn, and a solvent or hot water supplied to remove all of the combined component from the magnetic material which magnetic material will still be retained by the energized filter element 41. The solvent and separated component may be collected, if desired, and the component thereafter separated from the solvent or hot water. Then, by opening the switch 45, the filter element 41 may be de-energized and the magnetic material washed out of the filter by the introduction of any suitable fluid or vehicle as, for instance, by feed material supplied in the direction shown by arrows in Fig. 1, and returned with the magnetic material returned to the mixer 10.

The types of the separators 16, 18, 22 and 24 described above and their principles of operation may be varied within wide limits depending upon the nature and properties of the mixture, the component to be separated, the magnetic material and the wash fluid.

From the above description it will clearly appear that I have provided a new and improved method, and apparatus, for separating and selectively removing from a mixture comprising a plurality of components having varying affinities for a given magnetic material, of one predetermined component by the addition to, and combination with the mixture of the aforesaid magnetic material followed by magnetic separation from the mixture of the magnetic material along with the selected component combined therewith or adhering thereto.

It will further appear from the above description that the method and apparatus are susceptible of variation and modification within wide limits for adaptation to materials and mixtures of widely varying types and properties.

The combination of the selected component (sought to be removed from a given mixture) with the magnetic material introduced into the mixture may be merely mechanical, of varying degree, or chemical; the component may, for instance, form crystals about the magnetic particles as "seeds," the crystals being magnetically separable from the mixture. In other words, the word "combined," as used herein, means adhering or otherwise associated with i. e. divisible magnetically with the magnetic material from the other components or constituents of the mixture from which it is sought to be removed.

While the magnetic filter element 41 is illustrated as electrically energized i. e. electro-magnetic (which is generally preferable), the screens or grids thereof may be permanently magnetized whereby to make the magnetization of the filter element 41, and the magnetic field of the separator or filter 12, permanent.

It is, of course, to be understood that the above description is merely illustrative, and in no wise limiting and that I desire to comprehend within my invention such modifications as are comprehended within the scope of the following claims.

Having thus fully described my invention, what I claim as new and desire to secure by Letters Patent is:

1. In a method of separating the components of a fluid mixture containing components having affinities for a magnetic substance which vary with the temperature, said components being capable of forming solid precipitates thereon at different temperatures, introducing into a quantity of said mixture a quantity of said magnetic material in finely comminuted form, agitating said mixture and suspended magnetic material at predetermined temperature to secure precipitation of a selected component on said magnetic material at such temperature, thermally treating said mixture and suspended magnetic material to bring it substantially to a critical temperature wherein said magnetic material and selected component separates most readily from the other components of said mixture, then magnetically filtering from said mixture the magnetic material and precipitated selected component of said mixture, then discontinuing the flow of said mixture and de-energizing said magnetic filter whereby a portion of the magnetic material and surrounding selected component are released from said filter, then passing a wash fluid through said filter in the direction opposite the direction of flow of said mixture for removing the remaining magnetic material and surrounding selected component and then separating said wash fluid from said magnetic material and surrounding selected component.

2. In a method of separating the components of a fluid mixture containing components having varying affinities for a magnetic metallic substance at predetermined temperature, a selected component having the greatest affinity being capable of combining with said magnetic material for forming crystals of said component about fine particles of said magnetic material at said predetermined temperature, introducing into a quantity of said mixture a predetermined quantity of said magnetic metallic material in the form of fine particles, stirring said mixture and suspended magnetic material at said predetermined temperature to secure intimate contact and ultimate formation on said magnetic material of a crystalline precipitate by said selected component, then passing said mixture through a magnetic filter to separate out the magnetic material and surrounding crystals from said mixture, then discontinuing the flow of said mixture and de-energizing said magnetic filter whereby a portion of the magnetic material and surrounding crystals are released from said filter, then passing a wash fluid through said filter in the direction opposite the direction of flow of said mixture for removing the remaining magnetic material and surrounding crystals, and then separating said wash fluid from said magnetic material and surrounding crystals.

3. The method set forth in claim 2, including the step of separating the magnetic material and surrounding crystals from one another.

4. In a method of separating wax from an oil wax-mixture at predetermined temperature, the steps which comprise introducing into a quantity of said mixture a predetermined quantity of magnetic metallic material in the form of fine particles, stirring said mixture and suspended magnetic material at said predetermined temperature to secure intimate contact and ultimate formation on said magnetic material of said wax, then passing said mixture through a magnetic filter to separate out the magnetic material and surrounding wax from said mixture.

5. In apparatus for separating from a fluid mixture a selected component thereof capable of forming a solid precipitate on a magnetic material at predetermined temperature, means for mixing a magnetic material in comminuted form with said mixture while thermally treating said mixture and magnetic material to bring it to said predetermined temperature for causing precipitation of said selected component on said magnetic material because of its affinity at such temperature, an electro-magnetic filter, means for selectively energizing said filter, means for passing said thermally treated mixture and magnetic material through said filter when energized, means for deenergizing said filter and discontinuing flow therethrough of said mixture, means for removing from said filter a portion of said magnetic material and the precipitate formed thereon by said selected component when said filter is deenergized, and means operative when said filter is deenergized for passing through said filter in the direction opposite the direction of flow of said mixture a wash fluid for removing from said filter the magnetic material and combined component not removed by said last named means, and means for separating said wash fluid from said magnetic material and combined component.

6. The combination defined in claim 5, and means for separating said magnetic material and said component from one another.

AUGUST HENRY SCHUTTE.